(12) United States Patent
Akashika et al.

(10) Patent No.: US 8,266,436 B2
(45) Date of Patent: Sep. 11, 2012

(54) SERVICE PROVIDING SYSTEM, SERVICE PROVIDING SERVER AND INFORMATION TERMINAL DEVICE

(75) Inventors: Hideki Akashika, Tokyo (JP); Takeshi Takeuchi, Tokyo (JP); Shuichi Sekiya, Saimata (JP)

(73) Assignee: Felica Networks, Inc., Tokyo (JP)

( * ) Notice: Subject to any disclaimer, the term of this patent is extended or adjusted under 35 U.S.C. 154(b) by 599 days.

(21) Appl. No.: 12/273,205

(22) Filed: Nov. 18, 2008

(65) Prior Publication Data

US 2009/0217047 A1    Aug. 27, 2009

(30) Foreign Application Priority Data

Nov. 27, 2007  (JP) ................................. 2007-305837

(51) Int. Cl.
*H04L 9/32* (2006.01)
(52) U.S. Cl. ........ 713/175; 713/155; 713/189; 713/193; 380/277
(58) Field of Classification Search .................. 713/175, 713/155, 189, 193; 380/277
See application file for complete search history.

(56) References Cited

U.S. PATENT DOCUMENTS

| | | | | |
|---|---|---|---|---|
| 2003/0009683 A1* | 1/2003 | Schwenck et al. | ............ | 713/194 |
| 2004/0266523 A1* | 12/2004 | Gentles et al. | ................. | 463/29 |
| 2006/0000897 A1 | 1/2006 | Bonalle et al. | | |
| 2006/0080322 A1* | 4/2006 | Akashika et al. | ................ | 707/10 |
| 2006/0101136 A1* | 5/2006 | Akashika et al. | ............. | 709/223 |

FOREIGN PATENT DOCUMENTS

| | | |
|---|---|---|
| EP | 1 202 208 | 5/2002 |
| EP | 1 362 368 | 7/2003 |
| EP | 1 645 987 | 4/2006 |
| JP | 2004-247799 | 9/2004 |
| JP | 2005-352908 | 12/2005 |
| JP | 2006-040146 | 2/2006 |
| WO | WO 03/105096 | 12/2003 |
| WO | WO 2007/090786 | 8/2007 |

OTHER PUBLICATIONS

European Search Report for European Patent Application No./Patent No. 08253808.3-2212/2068264, dated Nov. 25, 2010 from the European Patent Office.

* cited by examiner

*Primary Examiner* — Carl Colin
*Assistant Examiner* — Ali Shayanfar
(74) *Attorney, Agent, or Firm* — Finnegan, Henderson, Farabow, Garrett & Dunner, L.L.P.

(57) ABSTRACT

A service providing system is provided, which includes a client device capable of accessing a tamper-resistant secure memory, an area management server managing memory area of the secure memory and a service providing server providing service that uses the secure memory to the client device, and which improves the security at the time of sending an access control list provided by the area management server and an instruction set provided by the service providing server to the client device by using a digital signature and a certificate.

8 Claims, 14 Drawing Sheets

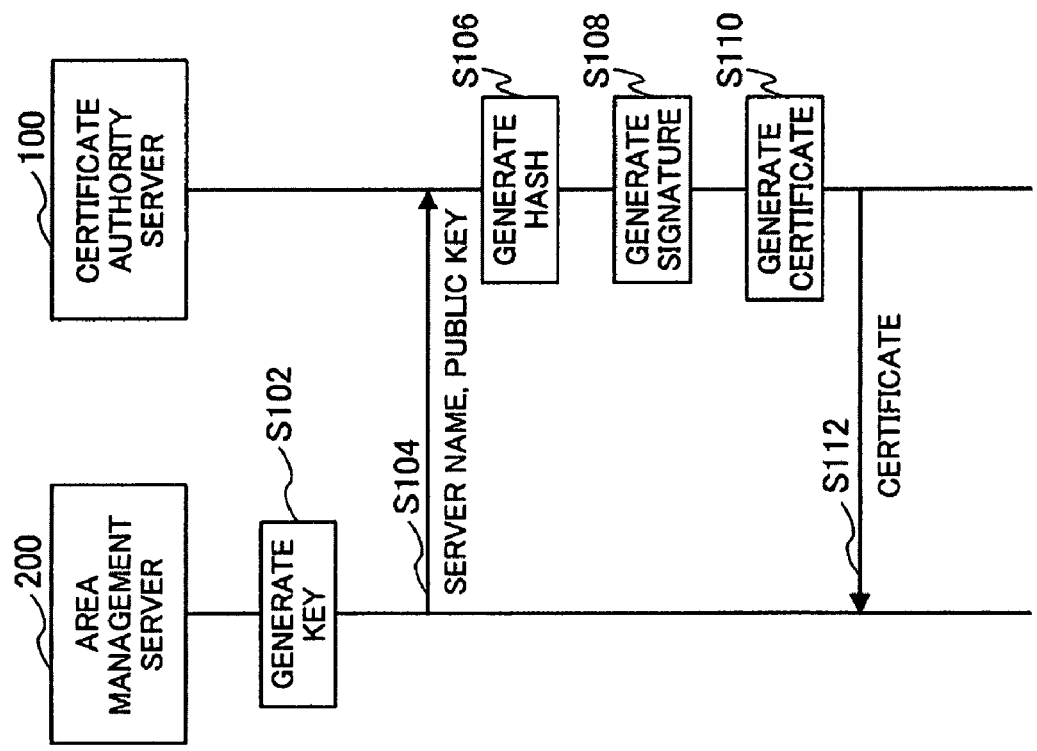

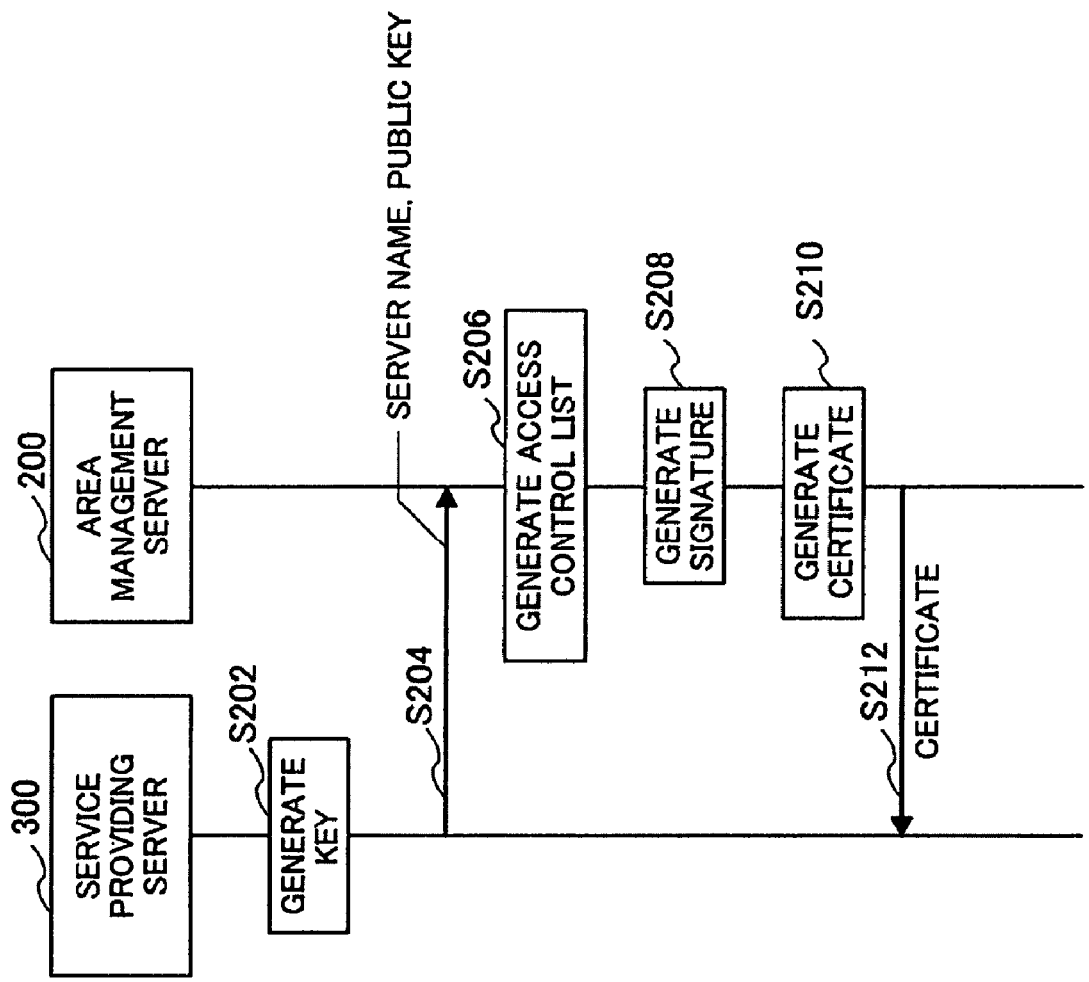

FIG.8

```
<?xml version="1.1" encoding="Shift_JIS"?>
<!DOCTYPE html PUBLIC "-//W3C//DTD XHTML 1.1//EN" "http://www.w3.org/TR/xhtml11/DTD/xhtml11.dtd">
<html xmlns="http://www.w3.org/1999/xhtml" xml:lang="ja" lang="ja">
<head>
<meta http-equiv="Content-Type" content="text/html; charset=Shift_JIS" />
<object name="felica" type="application/x-felica-plugin">
</object>
<script type="text/javascript" src="charge.js">
...
</script>
<title>ELECTRONIC MONEY LOADING</title>
</head>
<body>
<body onload="readPurseService();">
<p align="center">ELECTRONIC MONEY LOADING</p>
<form method="get" action="javascript:charge();">
<p align="center">ENTER AMOUNT OF MONEY TO BE LOADED<input type="text" name="amount"></input>
</p>
</body>
```

- `<script-signature>` SIGNING ON SCRIPT PAGE (BINARY DATA CONVERTED TO ASCII BY Base64 ENCODING OR THE LIKE) `</script-signature>` — 702
- `<sp-signature>` SERVICE PROVIDING SERVER CERTIFICATE (BINARY DATA CONVERTED TO ASCII BY Base64 ENCODING OR THE LIKE) `</sp-signature>` — 704
- `<dm-signature>` AREA MANAGEMENT SERVER CERTIFICATE (BINARY DATA CONVERTED TO ASCII BY Base64 ENCODING OR THE LIKE) `</dm-signature>` — 706

`</html>`

FIG.9

```
// ECMA Script for FeliCa
var felicaObj = nil;
var URL = "www.felicanetworks.co.jp";
function Charge() {
    var text = getTextField;
    return parseInt(text.value);
} function onOpenForCharge(errcode) {
    If (FeliCa.ERROR_NONE == errcode) {
        felicaObj.start(URL, onFinished, onError);
    } else {
        // PROCESS FOR Open FAILURE
    }
} function charge() {
    var amount = chargeAmount();
    if (isNaN(amount)) return;
    if (0 > amount) return;
    if (0 == amount) return;
    felicaObj.open(onOpenForCharge);
}

<script-signature>
    SIGNING ON SCRIPT PAGE (BINARY DATA CONVERTED TO ASCII BY Base64 ENCODING OR THE LIKE)
</script-signature>
<sp-signature>
    SERVICE PROVIDING SERVER CERTIFICATE (BINARY DATA CONVERTED TO ASCII BY Base64 ENCODING OR THE LIKE)
</sp-signature>
<dm-signature>
    AREA MANAGEMENT SERVER CERTIFICATE (BINARY DATA CONVERTED TO ASCII BY Base64 ENCODING OR THE LIKE)
</dm-signature>
```

FIG.11

```
<Area>
<!-- RANGE SPECIFICATION FOR ACCESS PERMITTED AREA -->
START OF ACCESS PERMITTED AREA:1000
END OF ACCESS PERMITTED AREA:1020
</Area>
<ACL>
<!-- ACCESS CONTROL FOR ACCESS PERMITTED AREA -->
SERVICE CODE:1008, ONLY Read IS PERMITTED, PERMITTED ACCESS FREQUENCY, ACCESS IS PERMITTED FOR 5 TIMES
SERVICE CODE:1010, ONLY Read IS PERMITTED, PERMITTED ACCESS FREQUENCY, NO RESTRICTION ON FREQUENCY
</ACL>
```

FIG.12

```
<Read> SERVICE CODE TO BE READ </Read>
<Write> SERVICE CODE TO BE WRITTEN </Write>
```

SERVICE PROVIDING SYSTEM, SERVICE PROVIDING SERVER AND INFORMATION TERMINAL DEVICE

CROSS REFERENCES TO RELATED APPLICATIONS

The present application contains subjected matter related to Japanese Patent Application JP 2007-305837 filed in the Japan Patent Office on Nov. 27, 2007, the entire contents of which being incorporated herein by reference.

BACKGROUND OF THE INVENTION

1. Field of the Invention

The present invention relates to a service providing system, a service providing server and an information terminal device.

2. Description of the Related Art

In recent years, a contact-type or a non-contact type IC (Integrated Circuit) card has become more frequently used in various situations. For example, such cards include a credit card or a cash card used in a financial institution, an IC card used at ticket gates of public transportation, an IC card used for payment at a restaurant or other retail stores, and the like. A mobile phone, a communication terminal or an information processor and the like, such as a personal computer and the like, provided with the functions of such IC cards are also becoming widespread.

A mobile phone and the like provided with an IC card or an IC card function has, embedded therein, an IC chip called secure chip capable of securely holding data. The secure chip stores, for example, data such as settlement information or ticket check history and an application for realizing various services. For example, by sending an instruction to the mobile phone and the like provided with the IC card or the IC card function, an information processor such as a reader/writer makes the mobile phone and the like execute the application stored in the secure chip and reads and writes the data in the secure chip.

In recent years, a technology for securely accessing data and applications held in a secure chip via an information processing function or a communication function of a mobile phone and the like provided with an IC card function has been attracting attention. In many cases, the mobile phone and the like has a higher computational capability and a higher communication capability than an IC card itself. Thus, to realize a service of higher level, it is desired to use these capabilities. However, a secure chip stores data, such as the remaining amount or the settlement information of electronic money or important personal information, and so high security for such data is required. Thus, to prevent alteration and the like of data stored in a secure chip, an access control technology for increasing the security level of the secure chip is desired.

However, when reading data stored in a secure chip or writing data in the secure chip, a conventional mobile phone provided with an IC card function executed the process via an application installed beforehand in the mobile phone and the like. The application is, for example, downloaded from an information source according to a secure method set by the provider of a communication service for the mobile phone and the like. By using such a method, an execution of an operation not intended by a user or an intentional locking of a secure chip according to an unauthorized access from the outside can be prevented. Also, for the service provider, it has the advantage that an application can be developed comparatively freely.

SUMMARY OF THE INVENTION

However, as recognized by the present inventors, when an access control method using an application is adopted, the burden relating to the development of the application or the maintenance therefor increases. Then, a method can be conceived of developing an application by using a script language such as ECMAScript or JavaScript which is less burdensome to use in developing the application. To realize this method, a mechanism for making a secure chip securely execute the application written in a script language (hereinafter, "script") is desired. The reason is that an instruction set described in a script language is in many cases text data. Thus, the possibility increases that the instruction set is altered on the network and the secure chip is accessed in an unauthorized manner, for example.

Accordingly, the present invention has been made in view of the foregoing, and it is desirable to provide a new and improved service providing system, a service providing server and an information terminal device capable of realizing a secure access to a secure chip based on a script.

In order to solve the above issue, according to an embodiment of the present invention, there is provided a service providing system including an area management server holding a first encryption key and a first decryption key corresponding to the first encryption key, a service providing server connected to the area management server and holding a second encryption key and a second decryption key corresponding to the second encryption key and a client device connected to the service providing server, capable of accessing a tamper-resistant secure chip and holding a third decryption key.

The area management server may be provided with an access control list generation section generating an access control list (ACL) in which a memory area of the secure chip, access to which is permitted to the client device, is described, a signature generation section generating a first digital signature, by using the first encryption key, from the second decryption key obtained from the service providing server and the access control list and a certificate generation section generating a service providing server certificate that includes the second decryption key, the access control list and the first digital signature.

The service providing server may be provided with an instruction set generation section generating an instruction set to be executed by the client server and a signature generation section generating a second digital signature, by using the second encryption key, from the instruction set.

The client device may be provided with an obtaining section obtaining an area management server certificate including the first decryption key and a third digital signature generated from the first decryption key and which can be decrypted by the third decryption key, the service providing server certificate and the second digital signature, a verification section verifying the area management server certificate by using the third decryption key, verifying the service providing server certificate by using the second decryption key extracted from the area management server certificate and verifying the second digital signature by using the first decryption key extracted from the service providing server certificate, and an access control section executing the instruction set only when the area management server certificate, the service providing server certificate and the second digital signature are properly verified by the verification section, and further, the instruction set is decrypted by the access control section from the second digital signature by using the second decryption key, and the memory area of the secure chip to be accessed according to the instruction set is included in the memory area of the secure chip indicated by the access control list extracted from the service providing server certificate.

The service providing system may be configured such that, in addition to the memory area of the secure chip, access to which is permitted to the client device, one or both of access right information restricting read process or write process of the client device and access frequency information restricting the frequency of access to the same memory area is to be permitted are described in the access control list, and the access control section provided in the client device executes the instruction set only when process of accessing the secure chip according to the instruction set meets the condition described in the access control list.

Further, in order to solve the above issue, according to another embodiment of the present invention, there is provided a service providing system including an area management server holding a first encryption key and a first decryption key corresponding to the first encryption key, a service providing server connected to the area management server and holding a second encryption key and a second decryption key corresponding to the second encryption key, an authentication server connected to the area management server and holding a third encryption key and a client device connected to the service providing server, capable of accessing a tamper-resistant secure chip and holding a third decryption key corresponding to the third encryption key.

The area management server may be provided with an access control list generation section generating an access control list in which memory area of the secure chip, access to which is permitted to the client device, is described, a signature generation section generating a first digital signature, by using the first encryption key, from the second decryption key obtained from the service providing server and the access control list and a certificate generation section generating a service providing server certificate that includes the second decryption key, the access control list and the first digital signature.

The service providing server may be provided with an instruction set generation section generating an instruction set to be executed by the client device and a signature generation section generating a second digital signature, by using the second encryption key, from the instruction set.

The authentication server may be provided with a signature generation section generating a third digital signature, by using the third encryption key, from the first decryption key obtained from the area management server and a certificate generation secretion generating an area management server certificate that includes the first decryption key and the third digital signature.

The client device may be provided with an obtaining section obtaining the area management server certificate, the service providing server certificate and the second digital signature, a verification section verifying the area management server certificate by using the third decryption key, verifying the service providing server certificate by using the second decryption key extracted from the area management server certificate and verifying the second digital signature by using the first decryption key extracted from the service providing server certificate and an access control section executing the instruction set only when the area management server certificate, the service providing server certificate and the second digital signature are properly verified by the verification section, and further, the instruction set is decrypted by the access control section from the second digital signature by using the second decryption key, and the memory area of the secure chip to be accessed according to the instruction set is included in the memory area of the secure chip indicated by the access control list extracted from the service providing server certificate.

The service providing system may be configured such that, in addition to the memory area of the secure chip, access to which is permitted to the client device, one or both of access right information restricting read process or write process of the client device and access frequency information restricting the frequency of access to the same memory area is to be permitted are described in the access control list and the access control section provided in the client device executes the instruction set only when process of accessing the secure chip according to the instruction set meets the condition described in the access control list.

Further, in order to solve the above issue, according to another embodiment of the present invention, there is provided a service providing server connected to an information terminal device that holds a first decryption key and that is capable of accessing a tamper-resistant secure chip and an area management server that manages access to the secure chip, and holding a second encryption key and a second decryption key corresponding to the second encryption key, wherein the service providing server has an obtaining section obtaining a first certificate that includes the second decryption key and which can be verified by the first decryption key and a second certificate that includes an access control list in which memory area of the secure chip, access to which is permitted to the information terminal device, is described and which can be verified by the second decryption key, an instruction set generation section generating an instruction set to be executed by the information terminal device and a signature generation section generating from the instruction set a digital signature which can be verified by using the second encryption key, and wherein the service providing server sends the first and the second certificates, the digital signature and the instruction set to the information terminal device.

In the access control list, in addition to the memory area of the secure chip, access to which is permitted to the information terminal device, one or both of access right information restricting read process or write process of the information terminal device and access frequency information restricting the frequency of access to the same area is to be permitted may be described.

Further, in order to solve the above issue, according to another embodiment of the present invention, there is provided an information terminal device connected to an area management server that manages access to a secure chip and a service providing server that holds a second encryption key and a second decryption key corresponding to the second encryption key, and holding a first encryption key and capable of accessing the tamper-resistant secure chip, wherein the information terminal device has an obtaining section obtaining a first certificate that includes the second decryption key and which can be verified by the first decryption key, a second certificate that includes an access control list in which memory area of the secure chip, access to which is permitted, is described and which can be verified by the second decryption key and a digital signature which can be verified by using the second encryption key from an instruction set to be executed by the information terminal device, a verification section verifying the first certificate by using the first decryption key and verifying the second certificate and the digital signature by using the second decryption key extracted from the first certificate, and an access control section executing the instruction set only when the first and the second certificates and the digital signature are properly verified by the verification section, and further, the memory area of the secure chip to be accessed according to the instruction set decrypted from the digital signature is included in the memory area of the secure chip indicated by the access control list extracted from a service providing server certificate.

The information terminal device may be configured such that, in addition to the memory area of the secure chip, access to which is permitted to the client device, one or both of access right information restricting read process or write process of the client device and access frequency information restricting the frequency of access to the same memory area is to be permitted are described in the access control list, and the access control section executes the instruction set only when process of accessing the secure chip according to the instruction set meets the condition described in the access control list.

According to the embodiments of the present invention described above, a secure access to a secure chip based on a script can be realized.

BRIEF DESCRIPTION OF THE DRAWINGS

FIG. 6 is an explanatory diagram showing a process of issuing an area management server certificate according to the embodiment.

FIG. 7 is an explanatory diagram showing a process of issuing a service providing server certificate according to the embodiment.

FIG. 8 is an explanatory diagram showing an example of a script page according to the embodiment.

FIG. 9 is an explanatory diagram showing an example of the script page according to the embodiment.

FIG. 11 is an explanatory diagram showing an example of an access control list according to the embodiment.

FIG. 12 is an explanatory diagram showing tag information according to the embodiment.

DETAILED DESCRIPTION OF THE PREFERRED EMBODIMENTS

Figure 1:
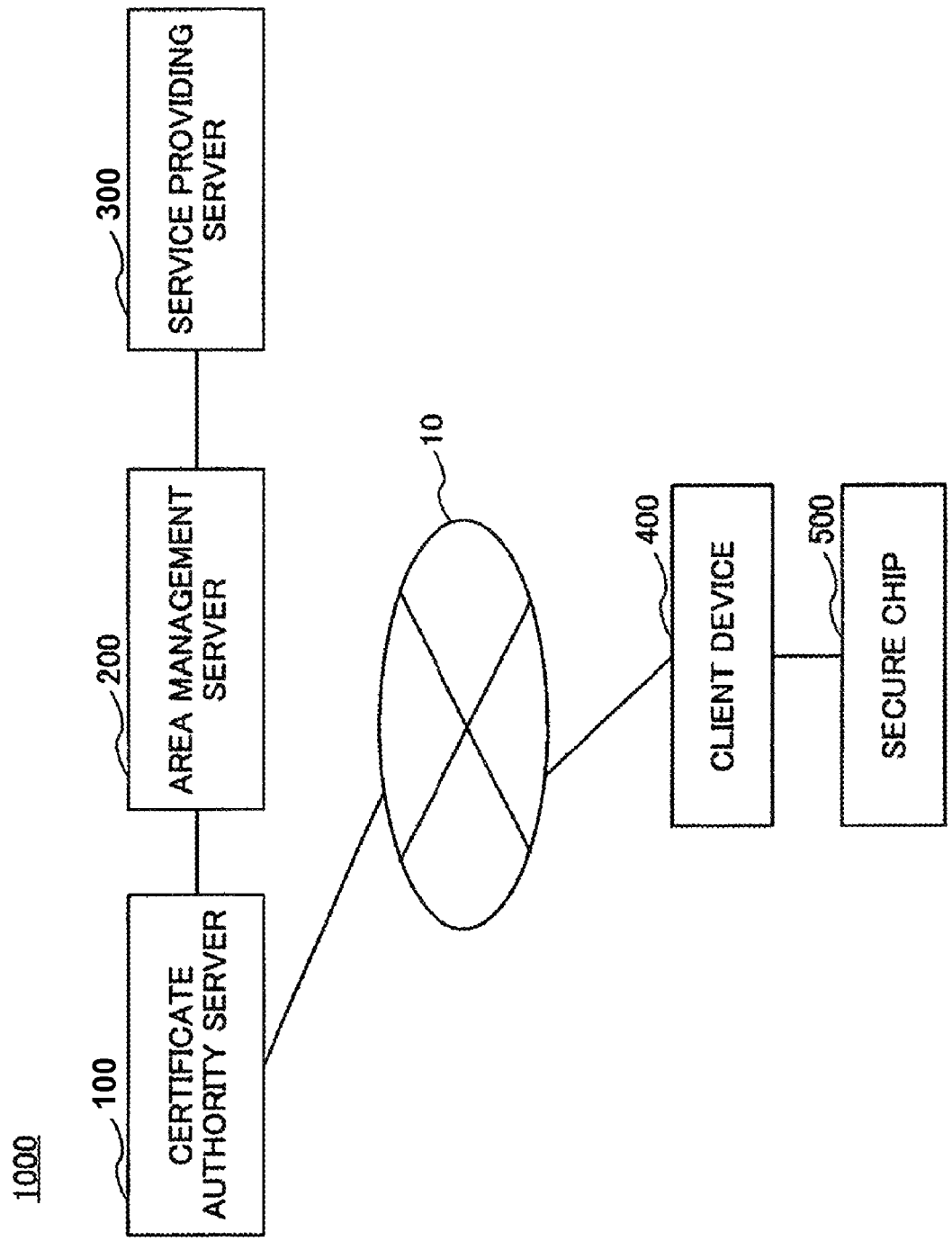
FIG. 1 is an explanatory diagram showing a service providing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, before describing the embodiments of the present invention in detail, an outline of the technical concept according to an embodiment will be briefly described. The technology according to the embodiment described below relates to a technology of securely accessing a secure chip by using a script.

Until now, various mechanisms have been conceived for securely executing on a predetermined information processor an application, such as Java and ActiveX, operating on a Web browser or an application operating on a mobile terminal. For example, there is a mechanism for putting a digital signature (hereinafter, "signature") on a hash value of these applications and verifying the signature based on a digital certificate (hereinafter, "certificate") held by the execution environment (for example, an information processor and the like) of the applications. However, in the present situation, there is no mechanism for making a secure chip or an information processor and the like securely execute an instruction (hereinafter, "script and the like") described in various script languages, XML tag or the like.

As another example, there is a technology of executing an application securely without using a digital signature. The example includes a technology of displaying a message such as "This application is not signed. Is it OK to execute the application?" to a user when an execution of an unsigned application is requested. However, in many cases, the user cannot judge whether the application is unauthorized or not. Thus, if this technology is used, it results in many of the unsigned applications not being executed.

Further, according to the existing access control technology, at the time of accessing a secure chip, a user has to go through the trouble of modifying a security setting file or installing an application. Further, it is difficult to deal with the memory area, access to which is permitted by an area manger managing the memory area of the secure chip, as a unit for access control.

Based on the current situation, the present inventors have come up with a technology of securely executing a script with an area manager managing the memory area of a secure chip and a service provider providing a service working in cooperation. Especially, the present inventors have come up with a technology of an access control technology of securely accessing the memory area in the secure chip, access to which is permitted by the area manager. As will be described in detail below, when applying such technology, it becomes possible to securely control access to the secure chip by a script. Accordingly, the burden relating to the development or the management is reduced, and further, it becomes possible to deal with the memory area, access to which is permitted by an area manger managing the memory area, as a unit for access control. Heretofore, the outline has been described.

With reference to FIG. 1, a configuration of a service providing system 1000 according to an embodiment of the present invention will be described. FIG. 1 is an explanatory diagram showing a configuration example of the service providing system 1000 according to the present embodiment.

Referring to FIG. 1, the service providing system 1000 according to the present embodiment is mainly configured with a certificate authority server 100, an area management server 200, a service providing server 300, a client device 400 and a secure chip 500. The service providing server 300 and the client device 400 are connected via a network 10.

The network 10 is a communications network connecting the service providing server 300 and the client device 400 in such a manner as to enable two-way or one-way communication. The network 10 includes, for example, a public line network such as the Internet, a telephone network, a communication satellite or a multicast communication network, and a dedicated line network such as a wide area network (WAN), a local area network (LAN), an Internet Protocol-Virtual Private Network (IP-VPN) or a wireless LAN, and it may be wired or wireless. Accordingly, the service providing server 300 is capable of sending information to the client server 400 via the network 10.

Further, the functions of the certificate authority server 100, the area management server 200 and the service providing server 300 are realized by using, for example, a Personal Computer (PC) provided with a server function. The client device 400 is a terminal device capable of performing a contact or a non-contact communication with the service providing server 300 via the network 10. The function of the client device 400 is realized by, for example, various portable terminals such as a mobile phone, a PHS, a portable game machine, a portable video/audio player or a Personal Digital Assistant (PDA), an information processor such as a PC or a home game machine, and an intelligent home appliance such as a DVD/HDD recorder, a television receiver or a tuner/decoder for television broadcast.

Figure 2:
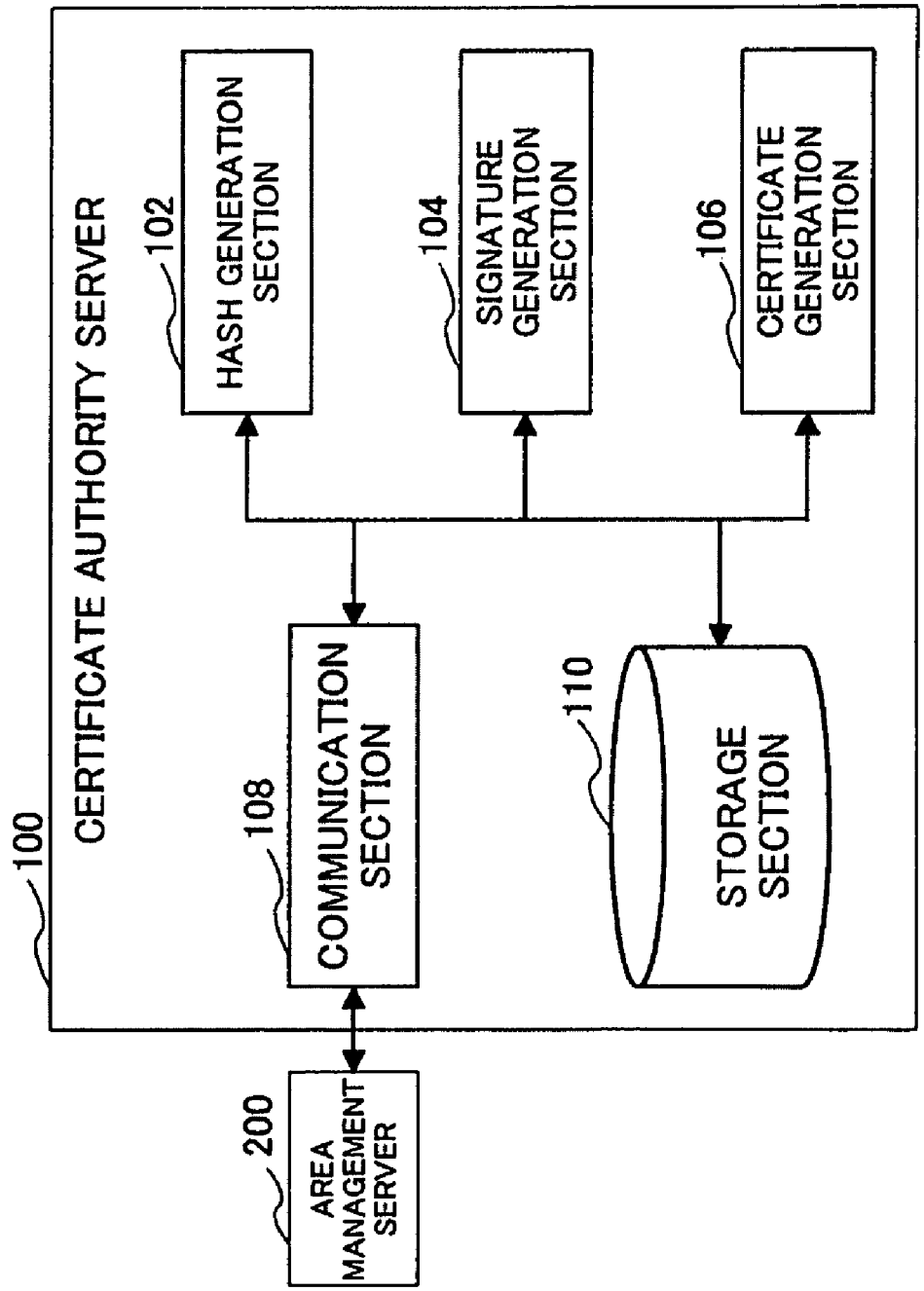
FIG. 2 is an explanatory diagram showing a configuration of a certificate authority server according to the embodiment.

First, with reference to FIG. 2, a configuration of the certificate authority server 100 will be described. FIG. 2 is an explanatory diagram showing a configuration example of the certificate authority server 100 according to the present embodiment.

The certificate authority server 100 is mainly configured with a hash generation section 102, a signature generation section 104, a certificate generation section 106, a communication section 108 and a storage section 110.

The hash generation section 102 generates an electronic document including a server name and a public key of the area management server 200 obtained from the area management server 200. The hash generation section 102 generates a hash value by compressing the electronic document by using a hash function. The hash function is a process or a function for extracting a typical numeric value having a predetermined length from input information. For example, MD4, MD5, SHA-1 and the like are used.

The signature generation section 104 encrypts the hash value generated by the hash generation section 102 by using a secret key in the certificate authority server 100. The signature generation section 104 generates a digital signature corresponding to the hash value. At this time, the secret key held by the certificate authority server 100 is a key that pairs with a public key (hereinafter, "root certificate") held by the client device 400. The hash value encrypted by the secret key can be decrypted by the root certificate. The root certificate is used at the time of using an encryption technology such as the SSL (Secure Sockets Layer), in a browser and the like. The certificate generation section 106 generates an area management server certificate including the digital signature (encrypted hash value), the public key of the area management server 200 and the server name of the area management server 200.

The communication section 108 sends/receives information to/from the area management server 200. The communication section 108 obtains the server name and the public key of the area management server 200 that are used at the time of the signature generation section 104 and the certificate generation section 106 generating the area management server certificate. Further, the communication section 108 sends the generated area management server certificate to the area management server 200. The storage section 110 stores the secret key corresponding to the root certificate held by the client device 400. The stored secret key is read by the signature generation section 104 as needed to be used. The storage section 110 may store the generated area management server certificate for a predetermined time.

With the configuration described above, the area management server certificate which can be verified by the root certificate held by the client device 400 is issued to the area management server 200.

Figure 3:
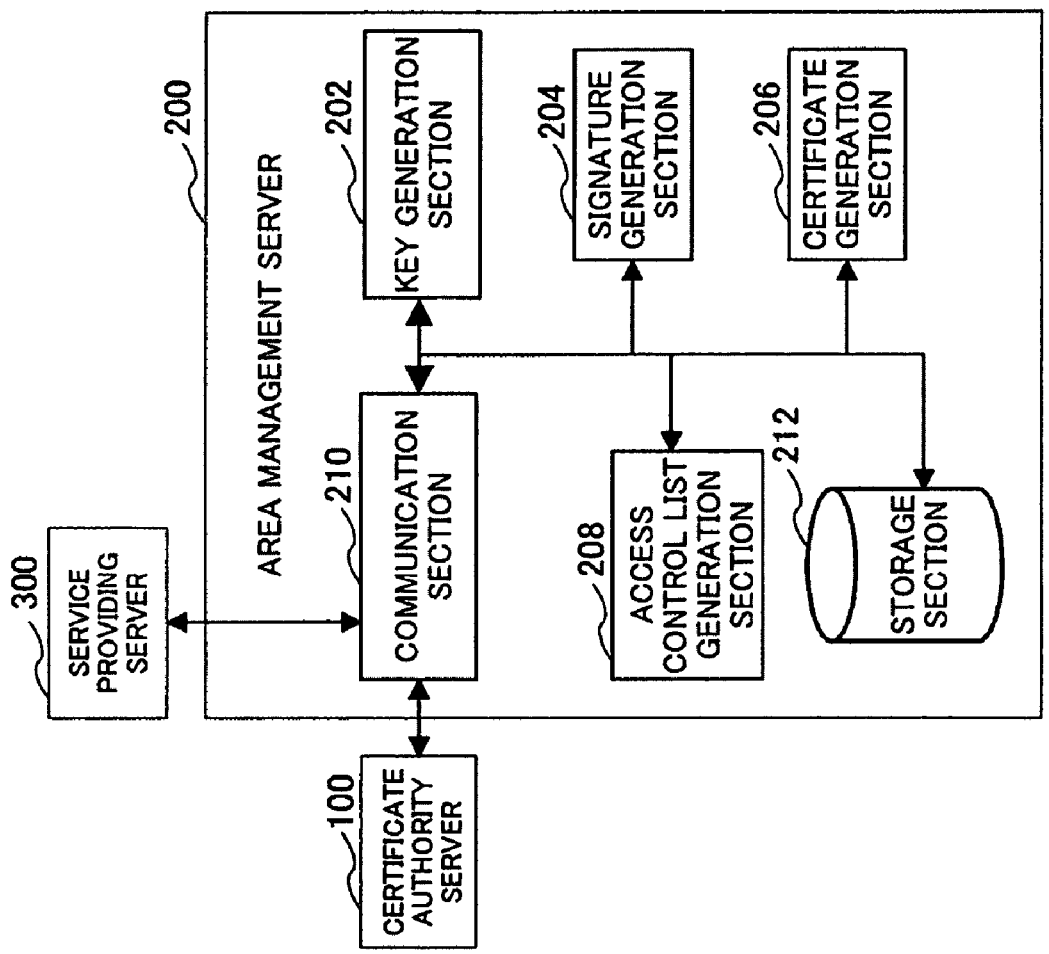
FIG. 3 is an explanatory diagram showing a configuration of an area management server according to the embodiment.

Next, with reference to FIG. 3, a configuration of the area management server 200 will be described. FIG. 3 is an explanatory diagram showing a configuration example of the area management server 200 according to the present embodiment.

As shown in FIG. 3, the area management server 200 is mainly configured with a key generation section 202, a signature generation section 204, a certificate generation section 206, an access control list generation section 208, a communication section 210 and a storage section 212. The area management server 200 is connected to the certificate authority server 100 and the service providing server 300 via the communication section 210.

The key generation section 202 generates a pair of a public key and a secret key. The public key generated by the key generation section 202 is sent to the certificate authority server 100. The public key is included in the area management server certificate generated by the certificate authority server 100. The secret key generated by the key generation section 202 is used at the time of issuing a service providing server certificate for the service providing server 300.

The access control list generation section 208 generates an access control list in which the scope of service area that can be accessed, an access right and the like are described at the time of, for example, the client device 400 accessing the secure chip 500 based on the script data or the tag information. The access control list generation section 208 issues the access control list for permitting access only to a predetermined service area assigned to the service providing server 300. The scope of service area, access to which is to be permitted, may be determined after receiving a request from the service providing server 300 based on the request. The tag information is a combination of a character string by which a rule of process to be executed is defined and a variable (refer to FIG. 12).

Here, with reference to FIG. 11, the access control list will be described. FIG. 11 is an explanatory diagram showing an example of the access control list according to the present embodiment.

For example, as shown in FIG. 11, a start address and an end address of an area which can be accessed are described in the access control list. The access right (for example, read permission, write permission, restriction on frequency of access permitted for the same area, etc.) set for each service code of the service area which can be accessed is described in the access control list. The client device 400 that obtained the access control list can execute the script data only when the access processing based on the script data meets the condition described in the access control list. With such configuration, unauthorized access to a service area based on the script data can be prevented.

Referring again to FIG. 3, the signature generation section 204 generates a hash value by compressing, by using a hash function, an electronic document including a server name and a public key of the service providing server 300 obtained from the service providing server 300 and the access control list. The signature generation section 204 encrypts the hash value by using the secret key of the area management server 200 generated by the key generation section 202. The certificate generation section 206 generates a service providing server certificate including the encrypted hash value, the public key of the area management server 200 and the access control list.

The communication section 210 sends/receives information to/from the certificate authority server 100 and the service providing server 300. Further, the communication section 210 obtains the server name and the public key of the service providing server 300 to be used at the time of the signature generation section 204 and the certificate generation section 206 generating a service providing server certificate. The communication section 210 sends the generated service providing server certificate to the service providing server 300.

The storage section 212 stores, for example, the pair of the public key and the secret key generated by the key generation section 202 and the access control list generated by the access control list generation section 208. The storage section 212 stores an area management server certificate and the like digitally signed by an issuer (for example, the certificate authority server 100) for issuing the root certificate to be held by the client device 400. The storage section 212 may store the server name and the public key of the service providing server 300 or the service providing server certificate generated by the signature generation section 204 and the certificate generation section 206.

With the configuration described above, the service providing server certificate which can be verified by using the public key of the area management server 200 is issued. Further, by using the access control list, access to the secure chip 500 is restricted.

Figure 4:
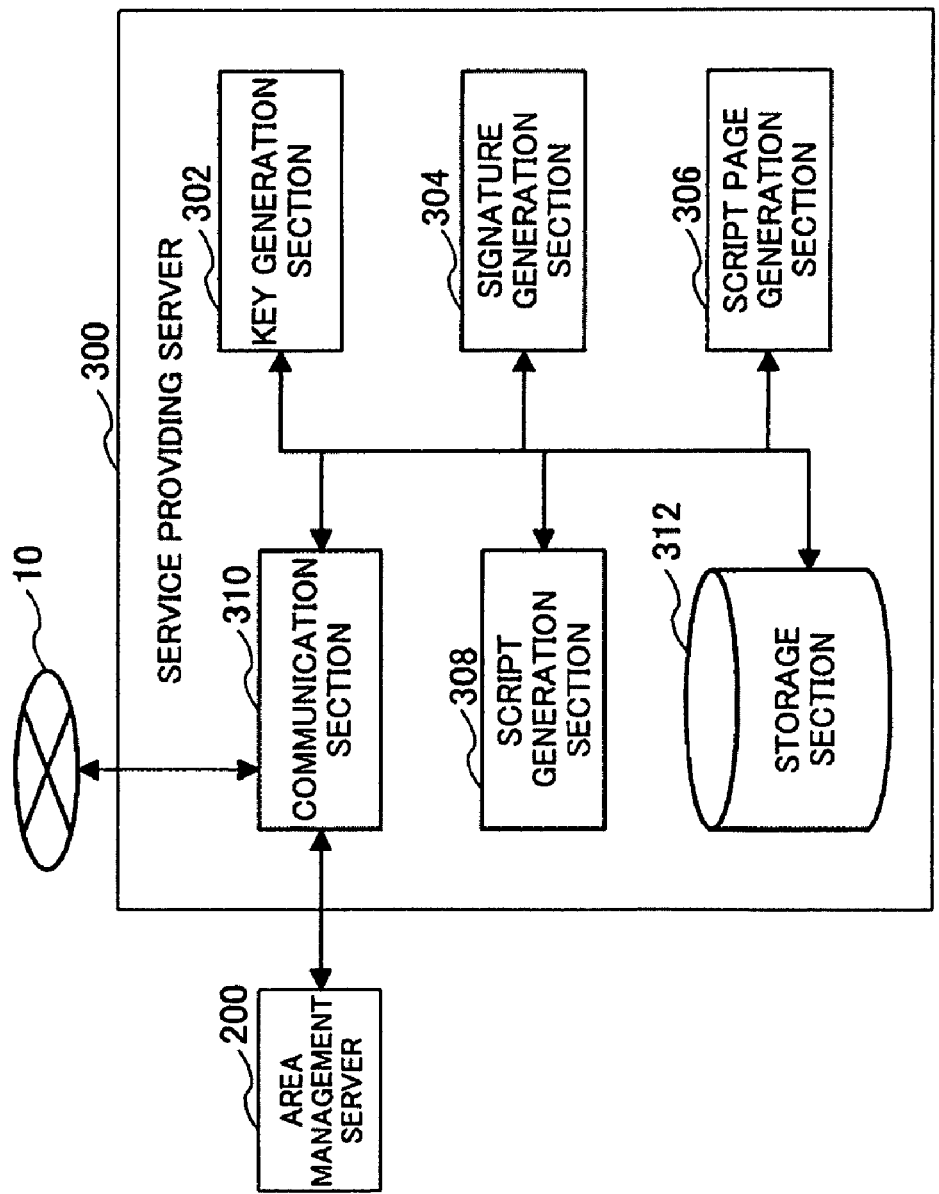
FIG. 4 is an explanatory diagram showing a configuration of a service providing server according to the embodiment.

Next, with reference to FIG. 4, a configuration of the service providing server 300 will be described. FIG. 4 is an explanatory diagram showing a configuration example of the service providing server 300 according to the present embodiment.

Referring to FIG. 4, the service providing server 300 is mainly configured with a key generation section 302, a signature generation section 304, a script page generation section 306; a script generation section 308, a communication section 310 and a storage section 312.

The key generation section 302 generates a pair of a public key and a secret key. The public key generated by the key generation section 302 is sent to the area management server 200. The public key is included in the service providing server certificate generated by the area management server 200. On the other hand, the secret key generated by the key generation section 302 is used at the time of generating script signature data.

The script generation section 308 generates script data in which processes to be executed by the client device 400 at the time of the service providing server 300 providing a service to the client device 400 is described. The script data is described in a script language such as ECMAScript or JavaScript (refer to FIGS. 8 and 9), for example, embedded in an HTML document and the like and is sent to the client device 400. For example, as the script data, ECMAScript and the like including an access control instruction to an IC chip is used.

The script generation section 308 may be configured to generate, instead of the script, tag information as shown in FIG. 12. In the following, although a case using the script will be mainly described, by replacing the script with the tag information, it can be modified into a mode of using the tag information. Accordingly, a case of using the tag information is also included in the technical scope of the present embodiment. As the tag information, a tag of the XML and the like are used, for example. In this case, by adding to the tag itself the contents of operation to the secure chip 500 and by describing in the tag information an ID and the like indicating a memory area on which the operation is to be performed, processes similar to those of the script are realized. As the ID, a service code and the like are used, for example.

The signature generation section 304 performs data scrambling such as digital signing or encryption on the script data generated by the script generation section 308. For example, the signature generation section 304 compresses the script data by using a hash function. Then, by encrypting the generated hash value by using the secret key in the service providing server 300, the signature generation section 304 generates the script signature data. In a case of a modified example using the tag information, the signature generation section 304 signs not the script but the entire tag.

The script page generation section 306 describes in a script page, in addition to the script data generated by the script generation section 308, the script signature data generated by the signature generation section 304 and the service providing server certificate and the area management server certificate obtained via the communication section 310. As shown in FIG. 8, in addition to the script data, script signature data 702, a service providing server certificate 704 and an area management server certificate 706 are described in the script page. In FIG. 8, although an example where the script page is described in HTML is shown, the present embodiment is not limited to such.

The communication section 310 has a function of sending/receiving information to/from the area management server 200 and a function of sending/receiving information to/from the client device 400 and the like via the network 10. The communication section 310 sends to the area management server 200 the public key of the service providing server 300 generated by the key generation section 302. The communication section 310 obtains the area management server certificate from the area management server 200. The communication section 310 sends to the client device 400, in addition to the script data, the script signature data, the service providing server certificate, the area management server certificate and the like.

The storage section 312 stores the pair of the public key and the secret key generated by the key generation section 302, the script data, the script page, the script signature data, the area management server certificate obtained from the area management server 200, and the like, for example.

With the configuration described above, the script signature data which can be verified by using the public key of the service providing server 300 included in the service providing server certificate is generated.

Figure 5:
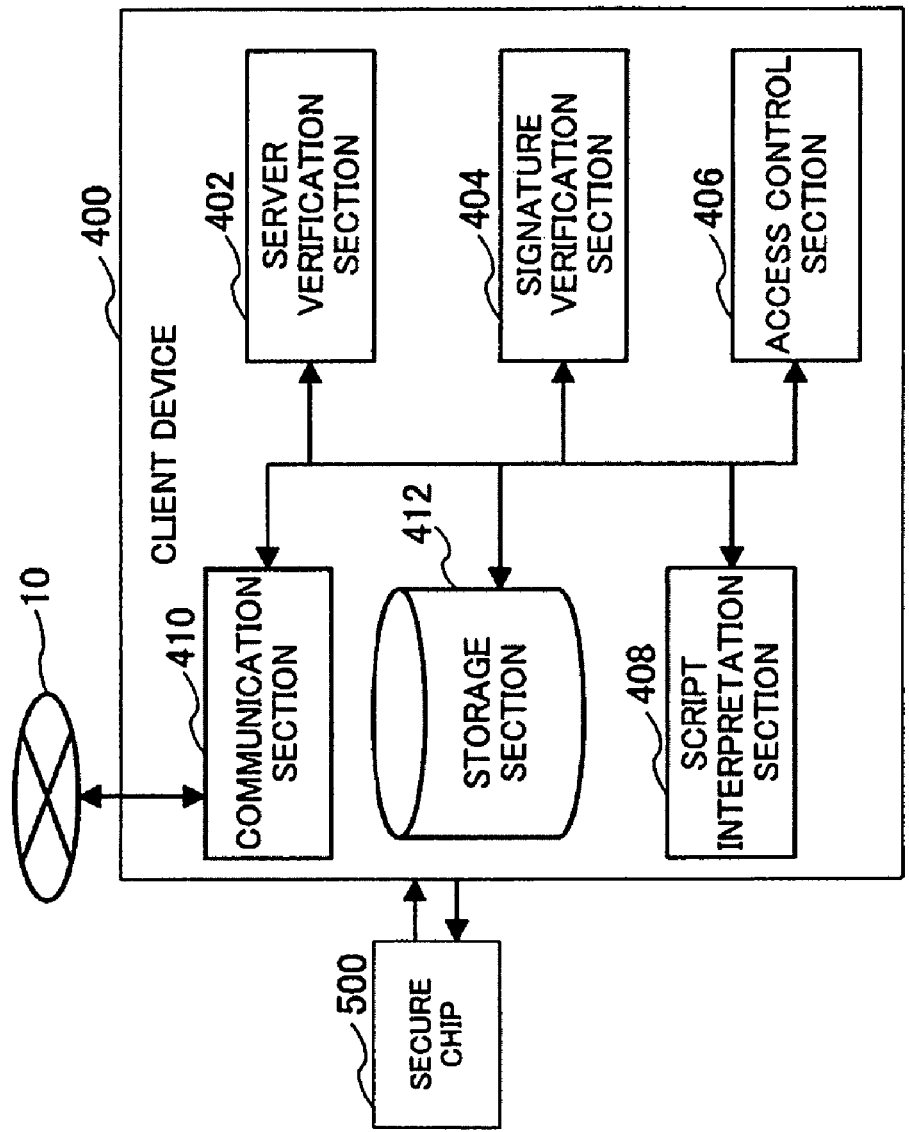
FIG. 5 is an explanatory diagram showing a configuration of a client device according to the embodiment.

Next, with reference to FIG. 5, a configuration of the client device 400 will be described. FIG. 5 is an explanatory diagram showing a configuration example of the client device 400 according to the present embodiment.

Referring to FIG. 5, the client device 400 is mainly configured with a server verification section 402, a signature verification section 404, an access control section 406, a script interpretation section 408, a communication section 410 and a storage section 412.

The server verification section 402 verifies the service providing server certificate, the area management server certificate, the server name of the service providing server 300 and the like obtained from the service providing server 300 via the network 10.

The server verification section 402 verifies the area management certificate by using the root certificate in the browser of the client device 400. Then, the server verification section 402 verifies the service providing server certificate and the access control list by using the public key of the area management server 200 obtained from the area management server certificate. At this time, the server verification section 402 obtains the access control list included in the service providing server certificate and stores the access control list in the storage section 412.

The verification of each of the certificates includes the process of decrypting each of the certificates by the public key corresponding to the secret key which encrypted the certificate. By the decryption, the server verification section 402 obtains the hash value, the public key and the like included in each of the certificates. The server verification section 402 compares and verifies the server name of the connected service providing server 300 and the server name obtained from the verified service providing server certificate.

The signature verification section 404 has a function of verifying the script signature data. The signature verification section 404 verifies the script signature data by using the public key of the service providing server 300 that the server verification section 402 obtained from the service providing server certificate.

The access control section 406 controls access to the secure chip 500 based on the script data. The script interpretation section 408 reads, as an execution instruction, codes described in the script data.

First, the access control section 406 accesses the secure chip 500 based on the script data read by the script interpretation section 408 only when the script signature data is verified. At this time, the access control section 406 refers to the access control list included in the service providing server certificate. The access control section 406 accesses only the service area described in the access control list and the access to which is permitted by the area management server 200. If script data for accessing a service area, access to which is not permitted by the access control list, exists, the access control section 406 outputs the error and stops the access to the secure chip 500.

When there is a description of the access right or the like in the access control list, the access control section 406 performs only the operations permitted by the access control list. When script data exists instructing an operation that is not permitted, the access control section 406 outputs error and stops the access to the secure chip 500.

The storage section 412 stores the script data, the script signature data, the service providing server certificate, the area management server certificate, the root certificate and the like received from the service providing server 300. The storage section 412 may store the public key of the service providing server 300, the public key of the area management server 200 and the like obtained at the time of verification of each certificate. The storage section 412 may store beforehand various certificates as needed.

With the configuration described above, the area management server certificate is verified by using the root certificate held by the client device 400. The service providing server certificate is verified by using the public key of the area management server 200 obtained from the area management server certificate. The script signature data is verified by using the public key of the service providing server 300 obtained from the service providing server certificate. Thus, the alteration of the script data in the network 10 or the client device 400 can be prevented. The access control list issued by the area management server 200 is included in the service providing server certificate. Thus, only the service area, access to which is permitted by the area management server 200, is accessed. Accordingly, security can be maintained.

Figure 14:
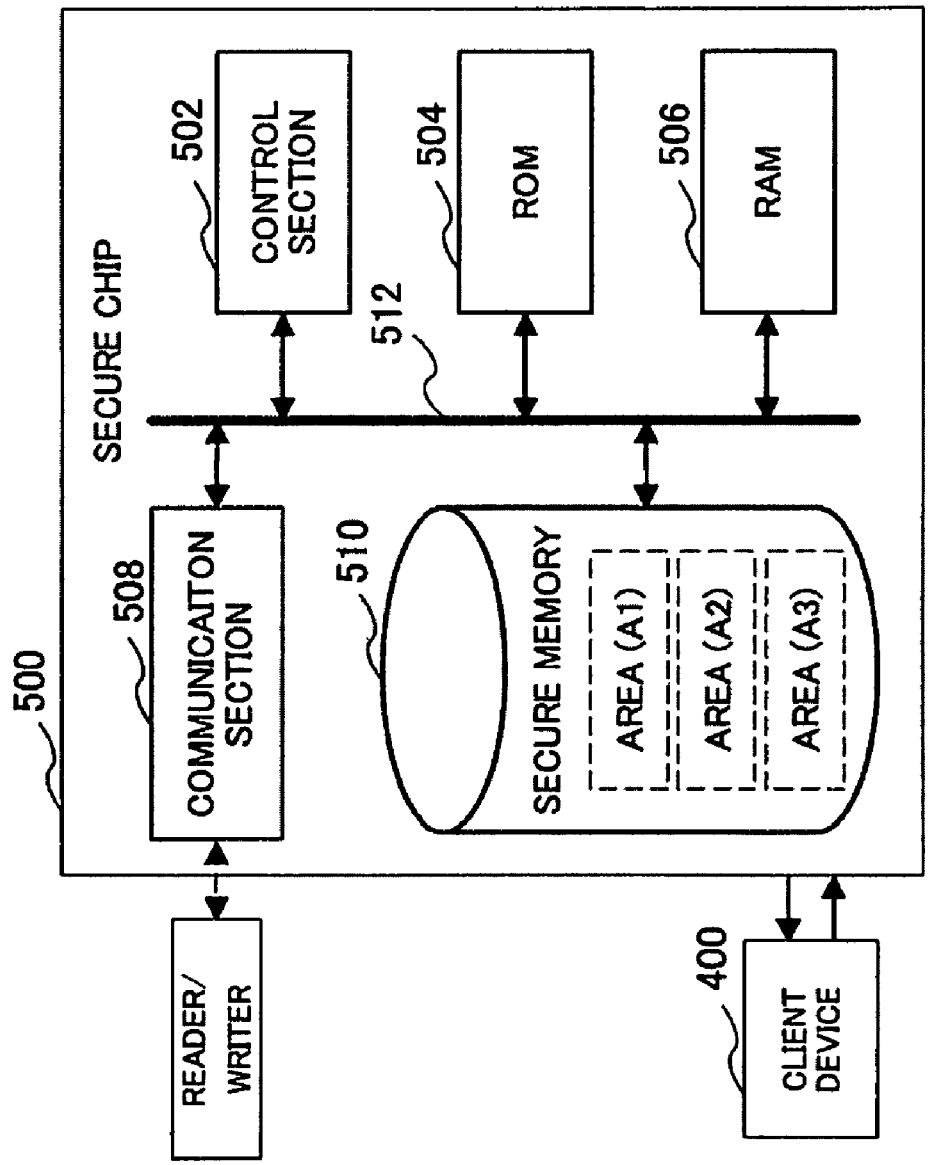
FIG. 14 is an explanatory diagram showing a configuration of a secure chip according to the embodiment.

Next, with reference to FIG. 14, a configuration of the secure chip 500 will be described. FIG. 14 is an explanatory diagram showing a configuration example of the secure chip 500 according to the present embodiment.

Referring to FIG. 14, the secure chip 500 is mainly configured with a control section 502, a ROM 504, a RAM 506, a communication section 508 and a secure memory 510. Note that the sections are connected via a bus 512 and can send information to each other. The secure chip 500 is a contact type or a non-contact type IC chip or IC card having tamper resistance, and the like, for example.

The secure chip 500 includes a loop antenna (not shown) connected to the communication section 508, for example, and sends/receives a carrier to/from a reader/writer for a non-contact type IC card. The secure chip 500 sends/receives information on the carrier and has power supplied from the reader/writer at the same time.

The communication section 508 can communicate with an external device such as the reader/writer, for example. The communication section 508 is mainly configured with a front-end circuit (not shown) and a power regenerating circuit (not shown). The front-end circuit receives information from the carrier originating from the reader/writer and, at the same time, regenerates a clock for driving each circuit in the secure chip 500 by dividing the carrier. The power regenerating circuit regenerates, from the carrier, the power for driving each circuit in the secure chip 50. Further, the secure chip 500 is connected to the client device 400 and can send the information received from the client device 400 to each section via the bus 512.

The control section 502 controls the operation of each section included in the secure chip 500 based on a program and data stored in the ROM 504 and the like or the execution instruction and the like from the client device 400. The control section 502, for example, reads data out of the secure memory 510 or writes data in the secure memory 510. Incidentally, the control section 502 is configured with a central processing unit (CPU) and the like, for example. The ROM 506 is used as, for example, a buffer for temporarily storing data sent or received via the communication section 508 or temporarily storing data and program used for computational process of the control section 502.

Figure 13:
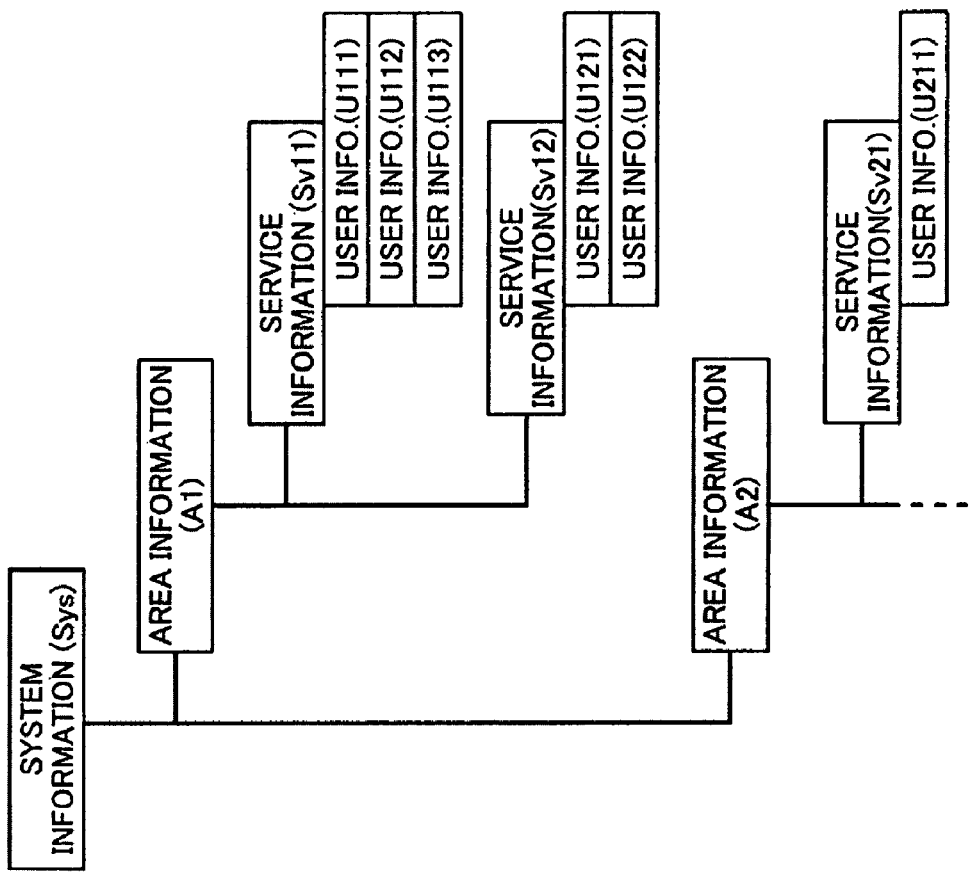
FIG. 13 is an explanatory diagram showing a data configuration of a secure memory according to the embodiment.

Here, with reference to FIG. 13, a data configuration of the secure memory 510 will be described. In the secure memory 510, system information (Sys), area information (A1, A2), service information (Sv11, Sv12, Sv21) is stored as management information. Further, in the secure memory 510, concrete user information (U111, U112, U113, U121, U122, U211) for each service defined in the service information (Sv11, Sv12, Sv21) is stored. For example, looking closely at the area information (A1) in FIG. 13, it is understood that the service information (Sv11) and the service information (Sv12) is defined by the area information (A1) and the user information (U111), the user information (U112) and the user information (U113) exists for the service information (Sv11).

To describe in more detail, first, the system information (Sys) is information including, for example, a system code, system key information and system key version information. The system code is a 2-byte length code indicating the owner of the system. Further, the system key information is set for each system, and is information that is used at the time of performing mutual authentication with a reader/writer and the like. The system key version information is information managing the system key version information.

The area information (A1, A2) is information including, for example, an area code, an end service code, allocated block number information, blank block number information, area key information and area key version information. The area code is a code for identifying an area. Normally, the system of the secure chip 500 manages the user information for each service, and further, uses area for a plurality of services for collective management. The area and the service are in a hierarchical structure, and the area is higher than the service in the structure.

Further, the end service code is a code defining the upper limit of the range of the code of a service belonging to an area. The allocated block number information is information indicating the number of blocks allocated to the area. The blank block number information is information indicating the number of blocks not allocated to any of the services belonging to the area. The area key information is key information specified for each area to perform mutual authentication with the area or the service set in the lower order of the area. The area key version information is information for managing the area key version information.

Next, the service information (Sv11, Sv12, Sv21) is information including, for example, a service code, allocated block number information, service key information and service key version information. The service code is a code for identifying a service. The allocated block number information is information indicating the number of user information blocks allocated to the service. The service key information is key information specified for each service. The service key version information is information for managing service key version information.

Next, the user information (U111, U112, U113, U121, U122, U211) is information that is actually read and written and includes concrete information such as a customer number, history information or electronic money value.

As such, the data structure of the secure memory 510 forms a hierarchical structure in the order of system information, area information and service information. Further, concrete user information for each of the services defined by the service information is stored in the secure memory 510. Thus, each user information can be referred to for each of the systems, each of the areas or each of the services, and efficient data management can be achieved.

So far, the data structure of the secure memory 510 has been described. The client device 400 according to the present embodiment accesses a predetermined area in the secure memory 510 based on the script data generated by the service providing server 300. At that time, the access control list (indicating that write process is permitted only for the service in the lower order of the area information (A1), for example; refer to FIG. 11) generated by the area management server 200 is referred to and the access control is realized that permits only the access to a predetermined area.

Next, with reference to FIG. 6, a process of issuing an area management server certificate will be described. FIG. 6 is an explanatory diagram showing the process of issuing an area management server certificate according to the present embodiment.

To issue an area management server certificate, first, the key generation section 202 provided in the area management server 200 generates a pair of a public key and a secret key (S102). Then, the area management server 200 sends to the certificate authority server 100 the server name and the public key of the area management server 200 via the communication section 210 (S104).

Next, the hash generation section 102 provided in the certificate authority server 100 generates a hash value by generating an electronic document including information such as the server name and the public key of the area management server 200 and expiration date and compressing the electronic document by a hash function (S106). Next, by using the secret key held by the certificate authority server 100, the signature generation section 104 generates a digital signature corresponding to the hash value (S108). Then, the certificate generation section 106 generates the area management server certificate including the digital signature and the public key in the certificate authority server 100 (S110). Subsequently, the certificate authority server 100 sends the area management server certificate to the area management server 200 via the communication section 108 (S112).

So far, the process of issuing an area management server certificate has been described. By applying the above-described processing method, it is made possible to issue an area management server certificate which can be verified by using a root certificate held by the client device 400.

Next, with reference to FIG. 7, a process of issuing a service providing server certificate will be described. FIG. 7 is an explanatory diagram showing the process of issuing a service providing server certificate according to the present embodiment.

To issue a service providing server certificate, first, the key generation section 302 provided in the service providing server 300 generates a pair of a public key and a secret key (S202). Then, the service providing server 300 sends the server name and the public key of the service providing server 300 to the area management server 200 via the communication section (S204).

Next, the access control list generation section 208 of the area management server 200 generates the access control list for accessing the secure chip 500 (S206). Then, the signature generation section 204 generates an electronic document including information such as the server name and the public key of the service providing server 300, the access control list and expiration date, compresses the electronic document by using a hash function, and then, encrypts the obtained hash value by using the secret key held by the area management server 200 (S208).

That is, the digital signature of the area management server 200 corresponding to the hash value is generated. Next, the certificate generation section 206 generates the service providing server certificate including the digital signature and the public key held by the area management server 200 (S210). Subsequently, the area management server 200 sends the service providing server certificate to the service providing server 300 via the communication section 210 (S212).

Heretofore, the process of issuing a service providing server certificate has been described. By applying the above-described processing method, it is made possible to issue a service providing server certificate which can be verified by using a public key of the area management server 200 included in an area management server certificate.

Next, a process of generating script contents according to the service providing server 300 will be described.

First, the script generation section 308 provided in the service providing server 300 generates script data for providing a predetermined service to the client device 400. Then, the signature generation section 304 compresses the script data by using a hash function, and then, encrypts the hash value by using the secret key in the service providing server 300 and generates script signature data.

Then, the script page generation section 306 describes, in addition to the script data, the script signature data, the service providing server certificate and the area management server certificate in the script page. For example, when HTML is used as the language for describing the script page, as shown in FIG. 8, in addition to the script data, the script signature data 702, the service providing server certificate 704 and the area management server certificate 706 are described. In case of an ECMA script, instead of the script page based on HTML, a script page as shown in FIG. 9 is generated.

Heretofore, the process of generating a script page has been described. By applying the above-described processing method, script signature data which can be verified by using the public key of the service providing server 300 included in the service providing server certificate is generated, and a script page is generated including the script signature data, the area management server certificate and the service providing certificate server that are needed for securely executing script data in the client device 400.

Figure 10:
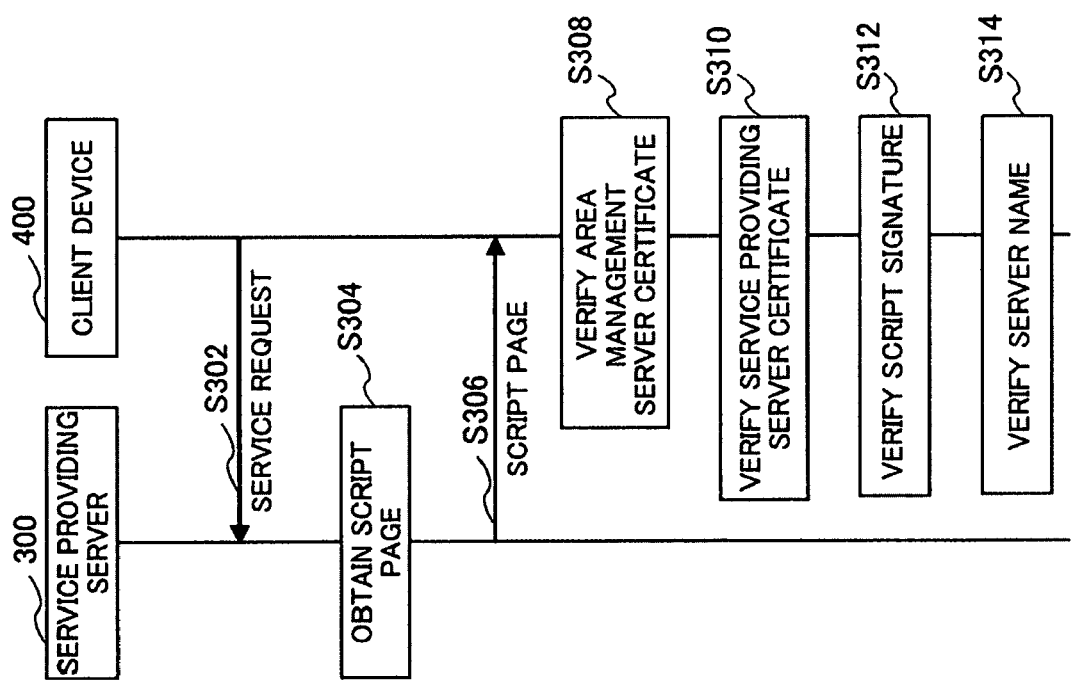
FIG. 10 is an explanatory diagram showing a process of verification before execution of a script according to the embodiment.

Next, with reference to FIG. 10, a process of verification before the execution of the script data will be described. FIG. 10 is an explanatory diagram showing the process of verification before the execution of the script data according to the present embodiment.

First, the client device 400 sends a service request to the service providing server 300 (S302). In response to this, the service providing server 300 obtains a script page including the script data, the script signature data, the service providing server certificate and the area management server certificate (S304). At this time, the service providing server 300 may obtain a script page which was generated beforehand or may generate a script page by using the script page generation section 306. Then, the service providing server 300 sends the script page to the client device 400 via the communication section 310 (S306).

Next, the server verification section 402 provided in the client device 400 verifies the area management server certificate by using the public key (root certificate) in the client device 400 (S308). Further, the server verification section 402 verifies the service providing server certificate by using the public key of the area management server 200 obtained from the area management server certificate (S310). Then, the signature verification section 404 verifies the script signature data by using the public key of the service providing server 300 obtained from the service providing server certificate (S312). Subsequently, the server verification section 402 verifies whether the server name of the service providing server 300 obtained from the service providing server certificate and the server name of the service providing server 300 that is connected to obtain the script are the same or not (S314).

Heretofore, the process of verification before the execution of the script data has been described. By applying the above-described processing method, it is made possible to detect the alteration of script data and an unauthorized access to the secure chip 500 can be prevented.

Next, a process at the time of execution of the script data by the client device 400 will be described.

By the process of verification before the execution of the script data, the client device 400 executes the script data obtained from the service providing server 300 only when the area management server certificate, the server providing server certificate, the script signature data and the server name are properly verified. Further, the client device 400 refers to the access control list obtained from the service providing server certificate and verifies whether or not the area of the secure memory 510, access to which is described in the script data, is within the range of the area described in the access control list. Then, if it is within the area range described in the obtained access control list, the client device 400 executes the script data. On the other hand, if it is not within the area range, the client device 400 creates an error and does not execute the script data.

Further, when the access right relating to read/write and the like is described or the frequency of access permitted for the same area and the like is specified in the obtained access control list, the client device 400 checks the type of the process based on the script data or the access frequency, and only when the condition described in the access control list is met, the client device 400 executes the script data.

Heretofore, the process at the time of execution of the script data has been described. By applying the above-described processing method, it is made possible to prevent the execution of the script data for accessing, in an unauthorized manner, a service area access to which is not permitted by the area management server 200, and the control of the secure access to the secure chip 500 by using the script data is realized. Further, by using the access control list, detailed access control for the access right or the frequency of access to the same area is also made possible.

By using the technology described above, a mechanism is realized that enables a secure control of access to a secure chip by using a script language such as ECMAScript or JavaScript, which can be developed more easily compared to an application developed with ActiveX, Java and the like, or tag information. Unlike a technology of signing the hash value of an application and having the client device verify the signature, it can be said for the subject technology that an extremely high security is achieved in that a security is ensured for a case where one of the area manager and the service provider cannot be trusted. Accordingly, by applying the technology according to the present embodiment, a higher security can be provided to the access control for a secure chip using an application.

Further, since access right can be granted to the client device 400 that enables access only to a service area, access to which is permitted by the area management server 200, without checking the content of the script data each time or obtaining permission for execution via a network, it is made possible to reduce the burden of the area management server 200. Further, even when the script data is altered in the network 10 between the service providing server 300 and the client device 400, since it is possible for the client device 400 to detect the presence/absence of alteration when verifying the script signature data, an effect that it becomes needless to construct an encrypted communication path such as SSL between the service providing server 300 and the client device 400 is achieved.

Further, since it is automatically judged by the signature verification whether or not the script data is authorized or not, when executing a script using a secure chip, a user does not have to judge whether the script is authorized or not. Further, even when a user connects to a malicious site, since error processing is performed at the time of signature verification, a risk that the unauthorized script is executed by the client device 400 can be reduced. It is needless to say that, even when the script is altered, since the script cannot be executed by the client device 400, security can be maintained.

It should be understood by those skilled in the art that various modifications, combinations, sub-combinations and alterations may occur depending on design and other factors insofar as they are within the scope of the appended claims or the equivalents thereof.

For example, the area management server certificate and the service providing server certificate may be held beforehand in the client device 400 or each certificate that was received before may be held therein to be used at the time of verification of the script signature data. Further, in the above-described embodiment, although the certificate authority server 100 is configured separately from other devices, it may be integrated with the area management server 200. Further, the present invention can be applied to access control for a secure chip using an application such as Java or ActiveX instead of the script.

What is claimed is:

1. A service providing system including:
an area management server holding a first encryption key and a first decryption key corresponding to the first encryption key;
a service providing server; and
a client device connected to the service providing server, configured to access a tamper-resistant secure chip and holding a second decryption key, wherein
the area management server comprises: a first memory storing computer instructions and a first processor configured to execute the computer instructions such that the area management server is configured to:
generate an access control list, the access control list specifying a memory area of the secure chip accessible to the client device,
generate a first digital signature by using the first encryption key to encrypt a value based on the access control list,
generate a service providing server certificate that includes a name of the service providing server, the access control list and the first digital signature; and
the service providing server comprises: a second memory storing computer instructions and a second processor configured to execute the computer instructions such that the service providing server is configured to:
generate an instruction set described in a script language to be executed by the client device, and
transmit the name of the service providing; and
the client device comprises: a third memory storing computer instructions and a third processor configured to execute the computer instructions such that the client device is configured to:
obtain an area management server certificate that includes the first decryption key and a second digital signature generated from the first decryption key and which can be decrypted by the second decryption key, the service providing server certificate, the instruction set and the name of the service providing server,
verify the area management server certificate by using the second decryption key,
verify the service providing server certificate by using the first decryption key extracted from the area management server certificate,
verify the name of the service providing server by using the name of the service providing server extracted from the service providing server certificate, and
execute the instruction set only when the area management server certificate, the service providing server certificate, and the name of the service providing server are properly verified, and further, the memory area of the secure chip to be accessed according to the instruction set is included in the memory area of the secure chip specified by the access control list extracted from the service providing server certificate.

2. The service providing system according to claim 1, wherein
the access control list describes one or both of access right information restricting read process or write process of the client device and access frequency information restricting the frequency of access to the memory area of the secure chip; and
the client device executes the instruction set only when the process of accessing the secure chip according to the instruction set meets the condition described in the access control list.

3. A service providing system including:
an area management server holding a first encryption key and a first decryption key corresponding to the first encryption key;
a service providing server;
an authentication server connected to the area management server and holding a second encryption key; and
a client device connected to the service providing server, configured to access a tamper-resistant secure chip and holding a second decryption key corresponding to the second encryption key, wherein
the area management server comprises: a first memory storing computer instructions and a first processor configured to execute the computer instructions such that the area management server is configured to:
generate an access control list, the access control list specifying a memory area of the secure chip accessible to the client device,
generate a first digital signature by using the first encryption key to encrypt a value based on the access control list, and
generate a service providing server certificate that includes a name of the service providing server, the access control list and the first digital signature; and
the service providing server comprises: a second memory storing computer instructions and a second processor configured to execute the computer instructions such that the service providing server is configured to:
generate an instruction set described in a script language to be executed by the client device,
transmit the name of the service providing server; and
the authentication server comprises: a third memory storing computer instructions and a third processor configured to execute the computer instructions such that the authentication server is configured to:
generate a second digital signature by using the second encryption key to encrypt a value based on the first decryption key obtained from the area management server,
generate an area management server certificate that includes the first decryption key and the second digital signature, and
the client device comprises: a fourth memory storing computer instructions and a fourth processor configured to execute the computer instructions such that the client device is configured to:
obtain the area management server certificate, the service providing server certificate, the instruction set and the name of the service providing server,
verify the area management server certificate by using the second decryption key,
verify the service providing server certificate by using the first decryption key extracted from the area management server certificate,
verify the name of the service providing server by using the name of the service providing server extracted from the service providing server certificate, and
execute the instruction set only when the area management server certificate, the service providing server certificate and the name of the service providing server are properly verified, and further, the memory area of the secure chip to be accessed according to the instruction set is included in the memory area of the secure chip specified by the access control list extracted from the service providing server certificate.

4. The service providing system according to claim 3, wherein
the access control list describes one or both of access right information restricting read process or write process of the client device and access frequency information restricting the frequency of access to the memory area of the secure chip; and
the client device executes the instruction set only when the process of accessing the secure chip according to the instruction set meets the condition described in the access control list.

5. A service providing server comprising:
a memory storing computer instructions;
one or more processors configured to execute the computer instructions such that the service providing server is configured to:
communicate with an information terminal device, wherein the terminal device is configured to access a tamper-resistant secure chip, hold a first decryption key, and access a secure memory and an area management server that manages the access to the secure memory,
obtain a area management server certificate that includes a second decryption key and which can be verified by the first decryption key and a service providing server certificate that includes an access control list, the access control list specifying as accessible to the client device a memory area of the secure memory accessible to the information terminal device, and a name of the service providing server, and which can be verified by the second decryption key, and
generate an instruction set described in a script language to be executed by the information terminal device, wherein
the service providing server sends the area management server certificate and the service providing server certificate, the name of the service providing server which can be verified by using the name of the service providing server extracted from the service providing server certificate and the instruction set to the information terminal device, wherein the information terminal device is configured to:
execute the instruction set only when the area management server certificate, the service providing server certificate, and the name of the service providing server are properly verified, and further, the memory area of the secure chip to be accessed according to the instruction set is included in the memory area of the secure chip specified by the access control list extracted from the service providing server certificate.

6. The service providing server according to claim 5, wherein
the access control list describes one or both of access right information restricting read process or write process of the information terminal device and access frequency information restricting the frequency of access to the memory area of the secure memory.

7. An information terminal device comprising:
a secure memory;
a memory storing computer instructions;
one or more processors configured to execute the computer instructions such that the information terminal is configured to:
hold a first decryption key,
communicate with an area management server that manages the access to the secure memory and a service providing server,
obtain an area management server certificate that includes a second decryption key and which can be verified by the first decryption key, a service provider certificate that includes an access control list, the access control list specifying an accessible memory area of the secure memory, and a name of the service providing server, and which can be verified by the second decryption key, the name of the service providing server which can be verified, by using the name of the service providing server extracted from the service provider certificate and an instruction set to be executed by the information terminal device;
verify the area management server certificate by using the first decryption key,
verify the service provider certificate by using the second decryption key extracted from the area management server certificate,
verify the name of the service providing server by using the name of the service providing server extracted from the service provider certificate, and
execute the instruction set only when the area management server certificate and the service provider certificate and the name of the service providing server are properly verified by the verification section, and further, the memory area of the secure memory to be accessed according to the instruction set is included in the memory area of the secure memory specified by the access control list extracted from the second certificate.

8. The information terminal device according to claim 7, wherein
the access control list describes one or both of access right information restricting read process or write process of the information terminal device and access frequency information restricting the frequency of access to the memory area of the secure memory; and
the terminal device executes the instruction set only when process of accessing the secure memory according to the instruction set meets the condition described in the access control list.

* * * * *